C. MENDEL.
COUPLING.
APPLICATION FILED FEB. 6, 1911.

1,027,267.

Patented May 21, 1912.

Witnesses.
D. C. Reinohl
H. F. Rueth

Inventor:
C. Mendel
by F. Dittmar
Attorney

UNITED STATES PATENT OFFICE.

CARLO MENDEL, OF TRIEST, AUSTRIA-HUNGARY.

COUPLING.

1,027,267. Specification of Letters Patent. Patented May 21, 1912.

Application filed February 6, 1911. Serial No. 606,905.

*To all whom it may concern:*

Be it known that I, CARLO MENDEL, a subject of the Emperor of Austria-Hungary, residing at Triest, in the Empire of Austria-Hungary, have invented certain new and useful Improvements in Couplings, of which the following is a specification, reference being had therein to the accompanying drawing.

This invention relates to improvements in that type of couplings for machine parts subjected to tensile strain, which are composed of two helical bodies, which when assembled together form a cylinder and in which the coupling takes place by screwing one part into the other and by locking them together after having been screwed home.

In order that my invention may be more fully understood I have caused to be appended hereunto one sheet of drawings marked with letters of reference indicating like parts in the various figures.

Figure 1:
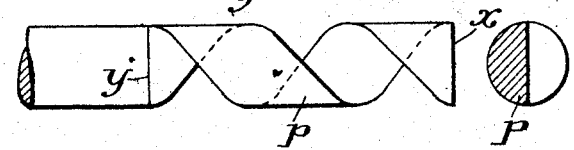
Figure 2:
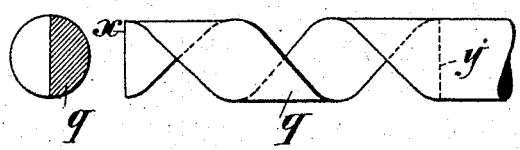
Figure 3:
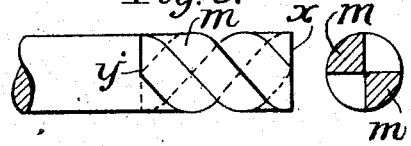
Figure 4:
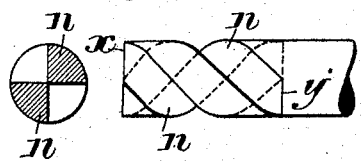
Figure 7:
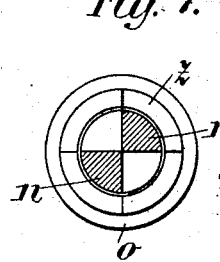
Figure 6:
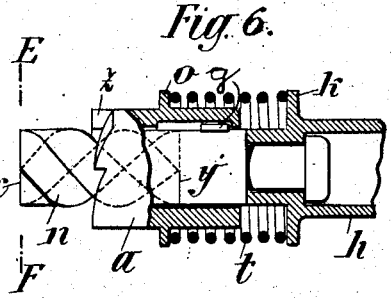
Figure 5:
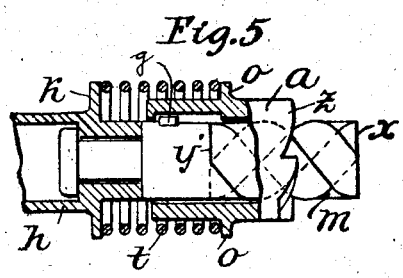

Figures 1 and 2 are side elevations and cross-sections in planes immediately in front of the end faces of the rods of the main parts of the coupling. Figs. 3 and 4 are analogous views of a slightly modified form of the coupling. Figs. 5 and 6 are sectional side elevations of the coupling arranged in accordance with this invention, the main parts of the coupling being those shown in Figs. 3 and 4. Fig. 7 is a cross section on line E—F Fig. 6.

In carrying out my invention and referring to the drawing, the main parts of the coupling are two helical bodies forming together a cylinder of circular cross-section as clearly shown in Figs. 1 to 4. The shape of the cross-section of the two helical bodies is either a half of a circular superficies, two of which form a full circular superficies, as shown in Figs. 1 and 2, or the shape is that of two diametrically opposite sectors $m$, $n$ of 90 degrees as shown in Figs. 3 and 4. The screwing into each other of the two halves of the coupling $p$ and $q$ in Figs. 1 and 2 and $m$ and $n$ in Figs. 3 and 4 that is to say, their connection, can only be effected by imparting to at least one of the two halves a rotary and progressive movement toward the other half, and locking it, as soon as it is screwed home to the other half. Such an automatic coupling is constructed so that the front face $x$ of each helical member shall abut against the rear face $y$ of the other helical member. As the disconnection of the two halves or members always involves a helical movement of one member relatively to the other, the interlocking of the two members after having been screwed home may be effected by causing the action of either of the kinds of movements to cease, namely, either the rotary or the longitudinal movement. By tensile strain, a rotary movement is obviously created in each half of the coupling.

As the moments of rotation created in both members of the coupling are of the same intensity and of opposite direction, it is possible to cause them to counterbalance each other by means of one half of a ratchet device attached to each member of the coupling working together in such a manner as to allow the coupling members to turn in the direction in which they screw into each other as well as to turn freely in both directions when being disengaged thereby providing a perfectly automatic coupling. Figs. 5 to 7 show such a coupling for tensile strain in which the helical coupling members, after being screwed together, are held in rigid coupling position by spring pressed sleeves $a$. The members $m$ and $n$ of the coupling are of the shape shown in Figs. 3 and 4, but the diametrically-opposite members of the pairs of sectors $m$ and $n$, on one, or both parts of the coupling are not integrally connected together at their central portion. Each of these members is revolubly inserted into a socket $h$ provided with a collar $k$ and carries a sleeve $a$ adapted to slide to and fro a given way along a key $g$ and having a collar $o$. Between the collars $o$ and $k$ there is a helical spring $t$ pressing the sleeve $a$ toward the inner end of the coupling member. The outer ends of both sleeves $a$, $a$ facing each other are provided with corresponding ratchet teeth in such positions that when coming in contact with each other in consequence of the screwing together of the two members $m$, $n$ of the coupling, they slide over each other, while turning in the opposite direction causes them to engage. Consequently, the coupling of the described structure is closed by simply moving the members $m$ and $n$ toward each other, while for uncoupling either of the sleeves $a$ is drawn rearward.

In cases when the members $p$, $q$ or $m$, $n$, of the coupling are not properly guided, it is advisable to make their ends taper in such a manner that the members enter each other even when the direction of movement of the same does not quite coincide with their geometrical axes. With such a structure, the axes of the members are linearly adjusted during the movement and consequently this adjustment also takes place automatically. When constructed in this special manner, the embodiments of the coupling shown in Figs. 5 to 7 are well adapted for the use as railway carriage couplings.

In operation the members $m$ and $n$ are moved toward each other by any preferred means, and interlocked as they are forced together, by their mutual rotation upon each other. When the outer ends of sleeves $a, a$ come into contact they rotate against each other, and on the application of the tensile strain, would at once become disengaged from each other, but on account of the pressure of the springs $t\ t$, the ratchets on the engaging faces of the sleeves $a$, catch upon each other and lock the spiral members together. By drawing back one of said sleeves, they are released from engagement, and the uncoupling of the parts follows.

Having thus fully described my invention, what I claim is—

1. In a coupling the combination with the parts to be coupled, of two similar helical coupling members, each having its outer end journaled to one of the parts to be coupled, a sleeve keyed on each of said coupling members, resilient means adapted to force the sleeves inward and mutually engaging ratchet teeth upon the inner ends of said sleeves, said ratchet teeth being adapted for engagement only when the coupling members are turned in the direction for uncoupling the same, as herein set forth.

2. In a coupling the combination with the parts to be coupled of two like-shaped helical coupling members, each having its outer end journaled to one of the parts to be coupled, a sleeve upon each of said coupling members adapted to slide along but not to turn around the same, springs adapted to urge the sleeves inward, and mutually engaging ratchet teeth upon the inner ends of the sleeves, the said ratchet teeth being adapted for engagement only when the coupling members are turned in the direction for uncoupling the same, substantially as and for the purpose described.

In testimony whereof I hereunto affix my signature in presence of two witnesses.

CARLO MENDEL.

Witnesses:
 ENRICO MAIONICA,
 AUGUSTO STUFFLER.